United States Patent [19]

Tonoki et al.

[11] 4,362,839
[45] Dec. 7, 1982

[54] MODIFIED POLYALKYLENE TEREPHTHALATE COMPOSITION

[75] Inventors: Satoshi Tonoki; Kazushi Hirobe; Tadashi Osawa; Masahiko Nishigaki, all of Kobe, Japan

[73] Assignee: Kanegafuchi Kagaku Kogyo Kabushiki Kaisha, Osaka, Japan

[21] Appl. No.: 184,463

[22] Filed: Sep. 5, 1980

[30] Foreign Application Priority Data

Sep. 7, 1979 [JP] Japan ................................. 54-115368

[51] Int. Cl.$^3$ ............................................. C08F 20/42
[52] U.S. Cl. ................................... 524/513; 524/539; 524/605; 528/300; 528/425; 525/437; 525/444
[58] Field of Search ................ 528/300, 425; 525/437, 525/444; 524/539, 605, 513

[56] References Cited

U.S. PATENT DOCUMENTS

| | | | |
|---|---|---|---|
| 3,957,706 | 5/1976 | Light | 260/22 R |
| 4,212,791 | 7/1980 | Avery | 260/40 R |
| 4,223,113 | 9/1980 | Bier | 525/439 |
| 4,277,584 | 7/1981 | Choi | 525/437 |

*Primary Examiner*—Allan Lieberman
*Assistant Examiner*—Pat Short
*Attorney, Agent, or Firm*—Moonray Kojima

[57] ABSTRACT

A modified polyalkylene terephthalate composition comprising polyalkylene terephthalate and polyoxyalkylene compound having metal salt of organic carboxylic acid. The composition, which can be used as a molding material, has improved workability, high crystallizing rate and excellent mechanical strength.

15 Claims, No Drawings

MODIFIED POLYALKYLENE TEREPHTHALATE COMPOSITION

BACKGROUND OF THE INVENTION

This invention relates to a modified polyalkylene terephthalate composition, and more particularly to such composition which can be used for molding.

A high molecular linear polyalkylene terephthalate obtained from a dicarboxylic acid or its ester-formable derivative and a diol or its ester-formable derivative has high softening point and excellent electrical, physical and mechanical properties, as well as heat resistance, chemical resistance, and light resistance. Such composition may be used, for example, as fibers, films, and moldings. When used for injection molding, however, such polyalkylene terephthalate is slower in crystallization rate than similar crystalline polymers, such as Nylon and polyacetal. Moreover, disadvantageously, polyethylene terephthalate, particularly, hardly proceeds to crystallization at temperatures below 100° C. In the prior art, it has been strongly desired to obtain a polyalkylene terephthalate composition, particularly those containing polyethylene terephthalate, which had improved crystallization properties, reduced molding cycle time, and wider range of temperatures for molding.

SUMMARY OF THE INVENTION

Accordingly, an object of the invention is to overcome the aforementioned and other disadvantages and deficiencies of the prior art.

Another object is to provide a modified polyalkylene terephthalate composition which has a high rate of crystallization, improved workability, improved moldability, excellent heat resistance, good mechanical strength, and reduced work time cycle for molding, and lower temperatures for molding.

The inventors have discovered that a polyoxyalkylene compound having an alkali-metal salt of an organic carboxylic acid at its molecular end, when copolymerizing with and/or mixed with a polyalkylene terephthalate, unexpectedly increases the crystalization rate of the polyalkylene terephthalate, and reduces the molding cycle time, and reduces the molding temperatures below 100° C. Also, it has been discovered that such novel composition produces molds having excellent heat resistance and mechanical strength.

The foregoing and other objects of the invention are attained in the invention which encompasses a modified polyalkylene terephthalate comprising a polyester consisting substantially of a polyalkylene terephthalate (a) and a polyoxyalkylene compound (b) having the general formula:

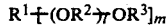

wherein $R^1$ is a hydrogen or an organic group of valence "m;" $R^2$ is an aliphatic hydrocarbon group having 2 to 4 carbon atoms; l is zero or a positive integer and at least 2 for 1 molecule; $R^3$ is partially hydrogen or is an organic group containing alkali metal salt or alkali earth metal salt of an organic carboxylic acid, and "m" is a positive integer of 1 through 6, the amount of polyoxyalkylene compound and polyalkylene terephthalate being such that the amount of the alkali metal is preferably between 0.0001 to 2.0%, and more preferably 0.1 to 0.5% by weight of the polyalkylene terephthalate (a).

The polyalkylene terephthalate may be copolymerized with and/or mixed with the polyoxyalkylene compound.

A feature of the invention is a modified composition comprising polyalkylene terphthalate and polyoxyalkylene compound having a metal salt of organic carboxylic acid.

Another feature is the copolymerization of the polyalkylene terephthalate and polyoxyalkylene compound and/or the mixing of the two to form the composition.

Other features are the preferred use of polyethylene terephthalate, or polybutylene terephthalate.

A further feature is the poloxyalkylene compound having a molecular weight preferably of between 200 and 20,000 and more preferably 200 to 6,000.

Other features are that the polyoxyalkylene compound has at least an alkali metal salt of carboxylic acid per molecule; and the polyoxyalkylene compound is preferably monohydroxypolyoxyalkylene having a metal salt of carboxylic acid at one end of each molecule; and that the alkali metal salt is in an amount preferably of from 0.0001 to 2.0 weight percent, more preferably 0.1 to 0.5 weight percent of the composition.

A further feature is the admixing of the composition with a filler, such as for example fire retardant agents, inorganic fillers, and the like.

DETAILED DESCRIPTION OF THE PREFERRED EMBODIMENTS

Polyalkylene terephthalate (a) used in the invention may be obtained by condensation polymerization, after direct esterification or after ester interchange, of a dicarboxylic acid component comprising at least 90 mol percent terephthalic acid and a diol component comprising at least 90 mole percent of alkylene glycol having 2 to 8 carbon atoms, such as ethylene glycol, propane-1, 3-diol, butane-1, 4-diol, pentane-1, 5-diol, hexane-1, 6-diol, or cyclohexane-1, 4-dimethanol. From an industrial viewpoint, polyethylene terephthalate and polybutylene terephthalate are most preferred. Up to 10 mol % of the dicarboxylic acid component of the polyalkylene terephthalate may be other aromatic dicarboxylic acids having 6 to 14 carbon atoms, aliphatic dicarboxylic acids having 4 to 8 carbon atoms, or alicyclic dicarboxylic acids having 8 to 12 carbon atoms. Such dicarboxylic acids include phthalic acid, isophthalic acid, 2,6-naphthalene-dicarboxylic acid, 4,4'-diphenyldicarboxylic acid, adipic acid, sebacic acid, and cyclohexanedicarboxylic acid.

Up to 10 mol % of the diol component may be other aliphatic diols having 3 to 10 carbon atoms, alicyclic diols having 6 to 15 carbon atoms or aromatic diols having 6 to 12 carbon atoms. Such diols include 2,2-dimethylpropane-1, 3-diol, 2,2-bis(4'-hydroxycyclohexyl)propane, 2,2-bis(4'-hydroxyphenyl)propane, and hydroquinone. Furthermore, hydroxycarboxylic acids, such as ε-hydroxycapronic acid and hydroxybenzoic acid may be copolymerized in an amount of 10 mol % or less of the dicarboxylic acid and diol components. Polyalkylene terephthalate may be branched by trihydric or tetrahydric alcohols or by tribasic or tetrabasic acids. Suitable branching agents are, for example, trimesic acid, trimellitic acid, trimethylolpropane, pentaerythritol.

The term "consisting substantially of" as used above means that the polymer chains are made up primarily of the defined alkylene terephthalate units, but that they may contain up to 10% by mol of other monomers such as described hereinabove. This is believed to meet with the established practice concerning the terminology of polyalkylene terephthalate.

The polyoxyalkylene compound (b) used herein is represented by the formula:

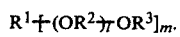

Such polyoxyalkylene compounds may be obtained, for example, by esterifying a monofunctional or polyfunctional alcohol, which is substantially polyoxyalkylene, with a polybasic carboxylic acid anhydride, and then neutralizing it with hydroxide or alcoholate of an alkali metal. They may also be obtained, for example, by reacting a monofunctional or polyfunctional alcohol, which is essentially polyoxyalkylene, with a monocarboxylic acid containing alkali metal carboxyl group or its ester forming derivative.

The alkali metal salt of carboxylic acid prepared by such method is shown by the formula:

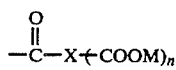

wherein "X" is a group selected from the group consisting of aliphatic hydrocarbon, alicyclic hydrocarbon, aromatic hydrocarbon, hydrocarbon halogenated thereof and a mixture thereof, "M" is an alkali metal and "n" is an integer of 1 to 5. Among the more preferred of group "X" is an aromatic hydrocarbon or halogenated aromatic hydrocarbon having 6 to 18 carbon atoms. When alkali earth metal is used in place of alkai metal, its salt may be defined as follows instead of the above:

Examples of such polyoxyalkylene compound are alkali metal salt or alkali earth metal salt of mono- and di-succinic esters, mono- and di-fumaric esters, mono- and di-phthalic esters, mono- and di-(tetrabromo)phthalic esters, and mono- and di-chlorendic esters of polyethyleneglycol, polypropyleneglycol, polytetramethyleneglycol, and ethylene oxide- propylene oxide copolymer, and sodium salt of monotrimellitic ester of monomethyoxypolyethylene glycol. Further, metal salt of mono-, di-, tri-, or tetra-phthalic esters and mono-, di-, tri-, or tetra-(tetrabromo) phthalic esters of glycerol-alkylene oxide addition product, trimethylolpropane-alkylene oxide addition product, and pentaerythrytol-alkylene oxide addition product are also preferred compounds.

It should not be considered, however, to be limited to those set forth as examples above. These compounds can be used singly or in combination of two or more. They can also be used together with polyoxyalkylene itself, such as ethylene glycol, polypropylene glycol, polytetramethylene glycol.

The crystallization rate of the polyalkylene terephthalate is remarkably improved by copolymerization and/or mixing dispersion with such polyoxyalkylene compound having end group or groups of alkali metal salt or alkali earth metal salt of carboxylic acid. This is considered due to improved mobility of the polyalkylene terephthalate chain and uniform dispersion of the carboxylic acid alkali-metal salt nucleating additive, resulting from the copolymerization or mixing dispersion of the polyoxyalkylene chains having lower glass transmission point into the polyalkylene terephthalate with good compatibility.

Copolymerization is preferred for attaining uniform dispersion of the polyoxyalkylene compound, which gives far more improved crystallization characteristics than in case of mixing. It is particularly preferred, for suppressing the lowering of melting point of the polyalkylene terephthalate, to copolymerize a monohydroxypolyoxyalkylene compound.

Polyoxyalkylene compounds, such as sodium salt of (tetrabromo) phthalic ester, having end group or groups of carboxylic acid alkali metal salt containing halogen atom in its organic group have an effect of improving fire retardance, in addition to improving crystallization properties. These polyoxyalkylene compounds may contain a small portion of other elements or groups than oxyalkylene unit, such as hydrocarbon having usually 1 to 18 carbon atoms, substituted hydrocarbon, hydrogen, tertiary carbon and the like. Those non-oxyalkylenic units may be residues from methanol, butanol, stearyl alcohol, bisphenol A, bisphenol S and other compounds which are placed in the polymerization system for preparing the polyoxyalkylene. The presence of such elements or groups does not diminish the effect of the alkali metal salt or alkali earth metal salt of the polyoxyalkylene compound.

Thus, the term "essentially" as used herein means that the compound may contain other elements or groups, such as shown above, in small amounts.

The molecular weight of the polyoxyalkylene compounds is in the range of preferably 200 to 20,000 and more preferably 200 to 6,000, in view of compatibility with the polyalkylene terephthalate chain.

The polyoxyalkylene compound and the polyalkylene terephthalate are used in such amounts that the amount of the alkali metal in the polyoxyalkylene compound, is preferably 0.001 to 2.0 weight percent, and more preferably 0.1 to 0.5 weight percent, based on the weight of the polyalkylene terephthalate. Below 0.001 weight percent, the crystallization properties are only slightly improved. Above 2.0 weight percent, the mechanical strength and heat resistance of the composition are decidedly decreased.

For example to obtain the above recited amounts, the polyester comprising the polyoxyalkylene compound and the polyalylene terephthalate may comprise preferably 0.1 to 30 weight percent and more preferably 1 to 20 weight percent of the polyoxyalkylene compound.

Although in the invention both alkali metal salt and alkali earth metal salt can be used alone or in combination, one can employ the alkali metal salt more advantageously when crystallization properties are considered to be significant. The copolymerization and/or mixing of the polyoxyalkylene compound and the polyalkylene terephthalate may be attained by adding and reacting or mixing same with and when the latter is manufactured. The polyoxyalkylene compound may be mixed with the polyalkylene terephthalate using a mixing apparatus, such as an extruder. The polymerization may be condensation polymerization in molten state afer mixing. It is also possible to subject successively, the copolymer or mixture to solid phase condensation polymerization.

By blending a granular or platy inorganic filler, the inventive composition may have increased mechanical strength, heat resistance, and dimensional stability. The granular and platy inorganic fillers which may be used are, for example, mica, kaolin, clay, talc, asbestos, calcium silicate, calcium sulfate, and calcium carbonate, in which mica and talc are the most preferred. These may be used singly or in combination of two or more. The amount to be blended is preferably 0 to 200 parts by weight of the filler to 100 parts by weight of the modified polyalkylene terephthalate composition, and more preferably 10 to 50 parts by weight, when considering mechanical strength, heat resistance and fluidity.

It is also possible in the invention to improve the heat resistance under high loads, mechanical strength at high temperatures, and dimensional stability of the composition, by blending a fibrous reinforcement with the inventive composition. The fibrous reinforcement materials which may be used in the invention may include, for example, glass fibers, mineral fibers, carbon fibers, silicon carbide fibers, boron carbide fibers, potassium titanate fibers, and gypsum fibers, in which glass fibers and mineral fibers are preferred. Fibrous reinforcements finished with a silane coupling agent to improve affinity for modified polyalkylene terephthalate composition, may be employed. The amount of fibrous reinforcement material to be blended is preferably 0 to 200 weight parts for 100 weight parts of the modified polyalkylene terephthalate composition, and more preferably 5 to 150 weight parts, when heat resistance, strength, fluidity, etc, are considered.

Furthermore, by blending a fire retardant, the inventive composition has improved fire retardance. The fire retardants which may be used in the invention include compounds containing an element in group III, IV, V or VII in the periodic table, with halogen compounds, phosphorous compounds, and antimony compounds being the most preferred. These can be used singly or in combination of two or more. Concrete examples of fire retardants are, for example, tetraborobisphenol A or its derivatives; decabromodiphenyl ether; tetrabromophthalic anhydride; perchlorocyclopentadiene derivatives; triphenyl phosphate, and antimony trioxide. The amount of blended fire retardant is preferably 0 to 30 weight parts for 100 parts by weight of the modified polyalkylene terephthalate composition.

For blending the granular or platy inorganic filler, fibrous reinforcement material, and fire retardant, any optional method can be used. For example, there may be employed mixing extrusion together with the modified polyalkylene terephthalate composition by use of an extruder, direct injection molding after simply mixing with the same, or blending with the modified polyalkylene terephthalate composition when it is being manufactured.

The thus obtained composition is particularly suitable to injection molding, but can be made into moldings also by other methods, such as by extrusion.

The composition obtained by the present invention reliably gives, as will become apparent from the following examples, moldings which have surprisingly improved crystallization properties and moldability, in comparison to the prior art moldings made from pure polyalkylene terephthalate. Also, the inventive composition imparts excellent mold release properties with use of surprisingly short molding time cycles; and excellent appearance, mechanical strength, and heat resistance. Particularly, in contrast to the prior art use of pure polyethylene terephthalate which provides satisfactory molding only when long molding time cycles are used and at molding temperatures above 140° C., the inventive modified polyalkylene terephthalate, such as polyethylene terephthalate, produces moldings having excellent release properties, excellent appearance, heat resistance, and mechanical strength but at surprisingly and advantageously short molding time cycles and at low molding temperatures.

The composition according to the invention can be blended with additives, such as plasticizers, lubricants, and coloring agents, as well as other known nucleating additives, heat and oxidation stabilizers, and light stabilizers. It can also be blended with a small amount of other types of thermoplastic resins or a small proportion of rubber compositions to improve impact resistance.

The composition of the invention can be widely used for molding various molded parts, and is particularly suitable for use in auto parts, and electrical parts. It can also be used as fibers, films, or sheets as desired.

The invention will be further illustrated in the following examples, which examples are not to be construed in any limiting sense.

In the examples, the intrinsic viscosity of the polymer was determined from logarithmic viscosity measured in pheno/tetrachloroethane (1:1 by weight) mixture at a concentration of 0.5 g/dl and 25° C. The melting point "Tm" of the modified polyalkylene terephthalate, cooling crystallization temperature "Tc(C)" from the molten state, and heating crystallization temperature "Tc(H)" from the glassy state, were measured with the DSC-1B type made by Perkin-Elmer Company. The tensile strength of the moldings was measured according to ASTM-D638 and the heat deflection temperature was measured according to ASTM-D648. The flammability was determined by the method based on the UL94 vertical test method.

EXAMPLES 1–5, CONTROL EXAMPLE 1

Into a 4 liter autoclave equipped with a stirrer, were placed 1942 g (10 mol) of dimethyl terephthalate, 1366 g (22 mol) of ethylene glycol, 1.2 g of zinc acetate and an ester interchange catalyst. The mixture was heated under stirring for 2 hours at 160° to 210° C. in a nitrogen atmosphere to effect ester interchange reaction. After the theoretical amount of methanol had been distilled out, each polyoxyalkylene compound (0.1 mol) shown in Table 1, 2.1 g of triphenyl phosphate, a heat stabilizer, and 0.7 g of antimony trioxide, a polycondensation catalyst, were added. Condensation polymerization of the contents was successively carried out at 270° C. and under a pressure below 1 Torr. The properties of the obtained polymers are shown in Table 1.

Dried chips of each of the above polymers were added with 0.5 wt.% of Ionox 330 (made by Shell Chemical Co.) and injection molded at a mold temperature of 90° C. with a molding time cycle of 25 seconds.

As the control specimen, a polyethylene terephthalate polymer was obtained using the same conditions as above, but without the addition of any polyoxyalkylene compound. It was then molded with addition of 0.5 weight percent Ionox 330 using a mold temperature of 90° C. and a molding time cycle of 75 seconds. The results are shown in Table 1.

As shown in Table 1, the inventive compositions, in comparison to the control specimen, had unexpectedly lower Tc(H) of 92°–97° C. (that is, practically sufficient crystallization even at temperatures below 100° C.).

TABLE 1

| Polyoxyalkylene compound (number-average molecular weight) | Examples | | | | | Control 1 |
|---|---|---|---|---|---|---|
| | 1 Polyethylene glycol monophthalate Na (2170) | 2 Polyethylene glycol mono-tri-mellitate 2Na (1740) | 3 Polytetramethylene glycol mono succinate K (790) | 4 Polyethylene glycol mono-(tetrabromo) phthalate Na (1980) | 5 Pentaerylthritol-ethyleneoxide addition-di-tri-mellitate 4Na (4480) | |
| Intrinsic η Viscosity dl/g | 0.70 | 0.65 | 0.75 | 0.65 | 0.72 | 0.69 |
| melting point °C. | 254 | 254 | 252 | 254 | 251 | 255 |
| cooling crystallization temperature Tc(C) °C. | 200 | 214 | 202 | 210 | 212 | 187 |
| Heating crystallization temperature Tc(H) °C. | 95 | 92 | 97 | 94 | 92 | 137 |
| mold release property of molding | good | good | good | good | good | poor |
| appearance of molding | good | good | good | good | good | poor |
| tensile strength kg/cm$^2$ | 550 | 520 | 590 | 540 | 560 | 650 |
| heat deflection temp. (4.7 kg/cm$^2$ load) °C. | 138 | 145 | 132 | 140 | 145 | 85 |

Moreover, the inventive copolymers as compared to the control specimen, have unexpectedly increased crystallization temperature range (Tc(C)–Tc(H)) while having only slightly lowered melting pointing of the crystal. The mold release property and appearance of the molding of the invention were good even with the short molding time cycle of 25 seconds and at the lower mold temperature of less than 100° C., namely 90° C. The moldings of the invention had higher heat deflection temperatures than the control specimen made of unmodified polyethylene terephthalate. Also, the invention had practically sufficient mechanical strength. The control specimen, in contrast, could not produce satisfactory moldings even though a longer molding time cycle of 75 seconds was used. The moldings having a small quantity of bromine element introduced therein, as shown in Example 4, had self-extinguishing properties.

EXAMPLE 5

Using petaerylthritol-ethylene oxide addition tri(tetrabromo) phthalate 3Na (0.1 mol) of average molecular weight 3040 as the polyoxyalkylene compound, a polymer having an intrinsic viscosity of 0.85 was obtained in the same manner as in Example 1. Dried chips of this polymer were added with 0.5 weight percent Ionox 330, an antioxidant, and 3 weight percent antimony trioxide, a fire retardant, and extruded with an extruder into pellets for injection molding. Moldings having good mold release properties and excellent appearance were obtained by injection molding at a molding temperature of 90° C. with a molding time cycle of 25 seconds, of the pellets.

EXAMPLES 6–12, CONTROL EXAMPLES 2,3.

Polyethylene terephthalate (intrinsic viscosity=0.80 dl/g) polybutylene terephthalate (intrinsic viscosity: 1.10 de/g), polyoxyalkylene compound, as shown in Table 2, mica (suzorite mica 200 HK, made by Kuraray Co, Ltd) glass fiber of 3 mm in fiber lengths (made by Asahi Fiber Glass Co) and a fire retardant were blended in the proportions shown in Table 2, and then extruded with an extrudere into kneaded pellets for injection molding. The mold release properties, appearance, tensile strength, and heat deflection temperatures of the obtained moldings are shown in Table 2.

As is apparent from Table 2, the blending of the polyoxyalkylene compound produces molding having good mold release properties, good appearance, high heat resistance, and unexpectedly shortened mold time cycles at unexpectedly low mold temperatures.

The blending of mica, an inorganic filler, and glass fiber, a fibrous reinforcement material, produces unexpected increase of tensile strength and heat resistance, and furthermore, produces unexpected improvement of molding properties. The blending of the fire retardant produces excellent self-extinguishing properties.

TABLE 2 (Part 1)

| EX | Polyethylene terephthalate (weight parts) | polybutylene terephthalate (weight parts) | Polyoxyalkylene compound (average molecular weight) ((weight parts)) | mica (wt parts) | glass fiber (weight parts) | fire retardant (weight parts) |
|---|---|---|---|---|---|---|
| 6 | 100 | — | polyethylene glycol monophthalate ½Ca (3240) ((10)) | — | — | — |
| 7 | 100 | — | polyethylene glycol diphthalate 2Na | — | — | — |

TABLE 2-continued

| EX | | | | | | |
|---|---|---|---|---|---|---|
| 8 | 100 | — | polyethylene glycol diphthalate 2Na (1830) ((10)) | 30 | — | — |
| 9 | 100 | — | polyethylene glycol diphthalate 2Na (1830) ((10)) | — | 50 | — |
| 10 | 100 | — | polyethylene glycol diphthalate 2Na (1830) ((10)) | — | 50 | Decabromodiphenyl ether, (10) antimony trioxide (5) |
| 11 | 100 | — | Polytetramethylene glycol di-trimellitate 4Na (1120) ((15)) | — | — | — |
| 12 | — | 100 | Polyethylene glycol di (tetrabromo) phthalate 2Na (2470) ((10)) | — | — | — |
| Cont. 2 | 100 | — | — | — | — | — |
| Cont. 3 | — | 100 | — | — | — | — |

(Part 2)

| EX | Mold temperature °C. | Molding time cycle (sec) | mold release properties & appearance | Tensile strength kg/cm² | Heat deflection temperature (under 4.7 kg/cm² load) °C. | (under 18.6 kg/cm² load) °C. | UL-94 |
|---|---|---|---|---|---|---|---|
| 6 | 90 | 25 | good | 600 | 128 | — | |
| 7 | 90 | 25 | good | 540 | 137 | — | |
| 8 | 90 | 20 | good | 690 | 212 | 150 | |
| 9 | 90 | 20 | good | 1320 | 226 | 224 | |
| 10 | 90 | 20 | good | 1200 | 225 | 223 | self-extinguishing (V-0) |
| 11 | 90 | 25 | good | 650 | 130 | — | |
| 12 | 90 | 15 | good | 500 | 164 | — | self-extinguishing (V-2) |
| Cont. 2 | 90 | 75 | poor | 590 | 80 | 65 | |
| Cont. 3 | 80 | 30 | poor | 520 | 154 | — | |

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A modified polyalkylene terephthalate composition comprising
   (A) 100 parts by weight of a polyester consisting substantially of polyalkylene terephthalate, with the alkylene unit thereof having from 2 to 15 carbon atoms;
   (B) a polyoxyalkylene compound having the general formula:

wherein $R^1$ is hydrogent or an organic group of valence "m," $R^2$ is an aliphatic hydrocarbon group having 2 to 4 carbon atoms, l is zero or a positive integer and at least 2 for 1 molecule, $R^3$ is a group containing an alkali metal salt or an alkali earth metal salt of carboxylic acid, or partially hydrogen, and "m" is an integer of 1 to 6, and in an amount so that the amount of said alkali metal is 0.001 to 2.0 weight percent of said polyester; and
   (C) 0 to 200 weight parts of a filler.

2. The composition of claim 1, wherein said polyalkylene terephthalate is a polyethylene terephthalate.

3. The composition of claim 1, wherein said polyalkylene terephthalate is a polybutylene terephthalate.

4. The composition of claim 1, wherein said polyoxyalkylene compound has a molecular weight of between 200 to 20,000.

5. The composition of claim 4 wherein said molecular weight is between 200 to 6,000.

6. The composition of claim 1, wherein said polyoxyalkylene compound has at least one alkali metal salt of carboxylic acid per molecule.

7. The composition of claim 1, wherein said alkali metal salt of carboxylic acid is shown by the formula:

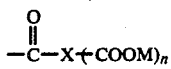

wherein "X" is a group selected from the group consisting of aliphatic hydrocarbon, alicyclic hydrocarbon, aromatic hydrocarbon, hydrocarbon halogenated thereof and a mixture thereof, "M" is an alkali metal and "n" is an integer of from 1 to 5.

8. The composition of claim 8, wherein "X" is an aromatic hydrocarbon having 6 to 18 carbon atoms.

9. The composition of claim 6, wherein said alkali metal is 0.1 to 0.5 weight percent of said polyester.

10. The composition of claim 7 wherein "X" is a halogenated aromatic hydrocarbon having 6 to 18 carbon atoms.

11. The composition of claim 1, wherein said polyoxyalkylene compound is copolymerized with said polyester.

12. The composition of claim 11 wherein said polyoxyalkylene compound is monohydroxypolyoxyalkylene having said metal salt of carboxylic acid at one end of each molecule.

13. The composition of claim 1, wherein said polyoxyalkylene compound is admixed with said polyester.

14. The composition of claim 1, wherein said filler is a fire retardant.

15. The composition of claim 1, wherein said filler is an inorganic filler.

* * * * *